(12) United States Patent
Yoshimi et al.

(10) Patent No.: US 6,468,943 B1
(45) Date of Patent: Oct. 22, 2002

(54) PLANT-CULTIVATING ARTIFICIAL MATERIAL AND PROCESS FOR PRODUCING THE SAME

(75) Inventors: Hitoshi Yoshimi, Toyota; Toshihiro Hattori, Anjyo, both of (JP)

(73) Assignee: Aisin Takaoka Co., Ltd., Toyota (JP)

( * ) Notice: Subject to any disclaimer, the term of this patent is extended or adjusted under 35 U.S.C. 154(b) by 0 days.

(21) Appl. No.: 09/639,109

(22) Filed: Aug. 16, 2000

(30) Foreign Application Priority Data

Aug. 24, 1999 (JP) .......................................... 11-237573
Jan. 20, 2000 (JP) ....................................... 2000-011468

(51) Int. Cl.$^7$ .......................... A01N 25/08; C05B 17/00
(52) U.S. Cl. .......................................... 504/101; 71/19
(58) Field of Search ............................... 504/101; 71/19

(56) References Cited

U.S. PATENT DOCUMENTS

| | | | | |
|---|---|---|---|---|
| 3,802,861 A | * | 4/1974 | Holst et al. ..................... | 71/45 |
| 4,493,725 A | * | 1/1985 | Moon elt la. ................... | 71/62 |
| 5,779,789 A | | 7/1998 | Kato ........................... | 106/900 |
| 5,843,857 A | | 12/1998 | Kato ........................... | 501/80 |
| 6,030,659 A | * | 2/2000 | Whitehurst et al. ......... | 427/214 |

* cited by examiner

Primary Examiner—S. Mark Clardy
(74) Attorney, Agent, or Firm—Oblon, Spivak, McClelland, Maier & Neustadt, P.C.

(57) ABSTRACT

A plant-cultivating artificial material includes: a porous sintered body containing at least one of silica and alumina; and a substance being mainly composed of a bone material component or calcium phosphate. A process for producing the plant-cultivating artificial material includes the steps of: preparing a base material containing at least one of silica and alumina, and a miring substance mainly composed of at least one of bone material and an additive; forming a green body; and heating the green body to obtain a porous sintered body so as to hold a bone material component or calcium phosphate in the porous sintered body. The porous sintered body may include a nitric acid component. The process may include the step of bringing the porous sintered body into contact with a liquid containing a nitric acid component.

31 Claims, 8 Drawing Sheets

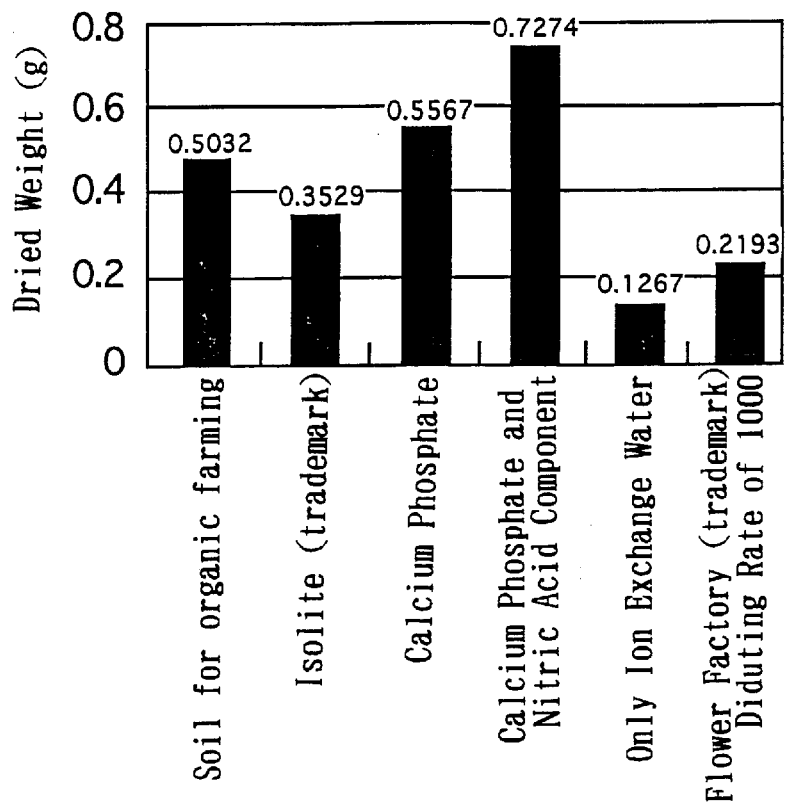
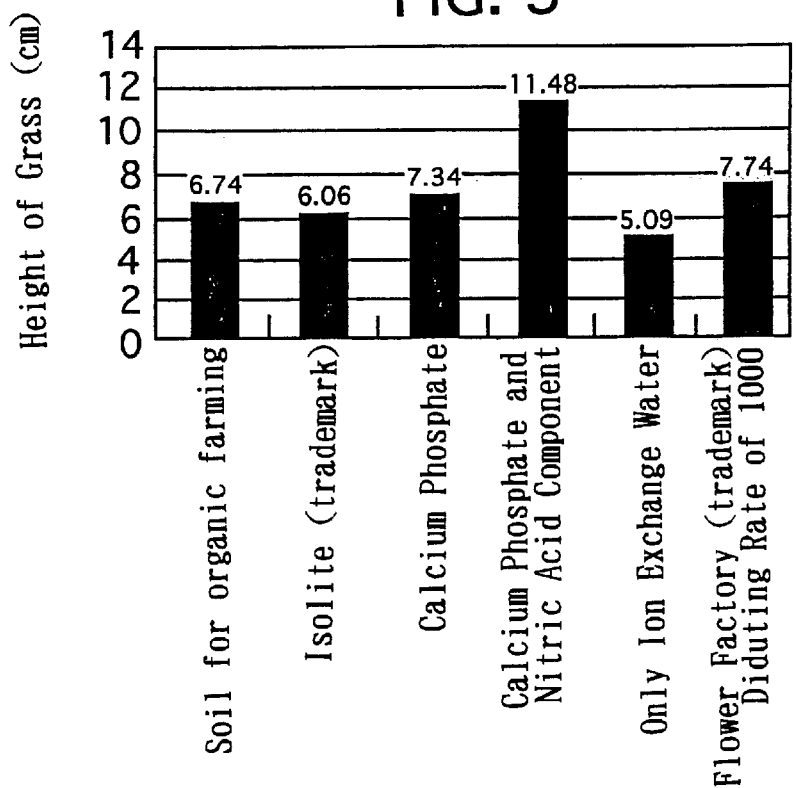

PLANT-CULTIVATING ARTIFICIAL MATERIAL AND PROCESS FOR PRODUCING THE SAME

BACKGROUND OF THE INVENTION

1. Field of the Invention

The present invention relates to a plant-cultivating artificial material, and a process for producing the same.

2. Description of the Related Art

Conventionally, there have been used various fertilizer components for promoting growth of plants. For example, bone meal has been added as a fertilizer in soil, containing calcium phosphate as a major component Although calcium phosphate constituting the bone meal corresponding to the fertilizer, is hardly dissolved by water; it can be dissolved by organic adds such as root acids secreted from roots of plants. Thus, such calcium phosphate comes to be absorbed into the roots of the plants together with water and other components included in soil.

Although bone meal is added in soil, the bone meal component dissolved by the organic acid easily flows together with water, such as rain water. Accordingly, water containing the bone meal component can easily escape from roots of plants. Thus, the above-described conventional technique does not always provide a sufficient effect of promoting growth of plants by addition of bone meal.

SUMMARY OF THE INVENTION

The present invention has been conceived in view of the above circumstances. It is an object of the present invention to provide a plant-cultivating artificial material and a process for producing the plant-cultivating artificial material which can promote growth of plants by holding of a bone material component or calcium phosphate.

In a first aspect of the present invention, a plant-cultivating artificial material comprises: (1) a porous sintered body containing at least one of silica and alumina as a major component; and (2) a substance mainly composed of a bone material component or calcium phosphate being held in the porous sintered body.

In the first aspect of the present invention, since the sintered body is porous, it has sufficient water-holding and air-ventilating abilities to promote growth of plants effectively. A bone material component is mainly composed of calcium phosphate or calcium phosphate from the composed additive—it is hardly dissolved by water but such can be dissolved by organic acids secreted from roots of plants.

Fertilizer components are generally absorbed to plants together with water. A component supplied from the bone material being held in the sintered body, or calcium phosphate supplied from the additive mainly composed of calcium phosphate can be dissolved by organic acids to form nourishing water. The nourishing water can be easily held in pores of the sintered body and hardly escapes from the pores of plant-cultivating artificial material Also, having sufficient hardness to provide a strong structure, the sintered body constituting the plant-cultivating artificial material can hold the nourishing water throughout a long term.

In a second aspect of the present invention, a plant-cultivating artificial material comprises: (1) a porous sintered body containing at least one of silica and alumina as a major component; (2) a substance mainly composed of a bone material component or calcium phosphate being held in the porous sintered body; and (3) a nitric acid component being held in the porous sintered body.

In the second aspect of the present invention, since the sintered body is porous, it has sufficient water-holding and air-ventilating abilities to promote growth of plants effectively. A bone material component is mainly composed of calcium phosphate or calcium phosphate from the composed additive—it is hardly dissolved by water but such can be easily dissolved by organic adds secreted from roots of plants to form a nourishing water. Also, such can be easily dissolved by nitric acid solutions to form a nourishing water when the nitric add component is dissolved by water to form nitric acid solutions. This nourishing water is easily held in pores of the sintered body to hardly escape from the pores of the plant-cultivating artificial material. Also, the sintered body constituting the plant-cultivating artificial material can hold the nourishing water throughout a long term having a hardness to hardly be broken.

A third aspect of the present invention provides a moderate process for producing the plant-cultivating artificial material described in the first aspect. In the third aspect of the present invention, a process for producing a plant-cultivating artificial material comprises the steps of (1) preparing a base material containing at least one of silica and alumina as a major component and having a powder or granular shape, and preparing a mixing substance mainly composed of at least one of bone material and an additive, the bone material containing calcium phosphate and gathered from an organism, the additive mainly composed of calcium phosphate; (2) mixing the base material with the mixing substance to obtain a mixture, and forming a green body by the mixture; and (3) heating the green body in a heated atmosphere to obtain a porous sintered body so that it can hold the bone material component supplied from the bone material or to hold calcium phosphate supplied from the additive in the porous sintered body, thereby obtaining a plant-cultivating artificial material.

In the third aspect of the present invention, the porous sintered body can hold a bone material component supplied from the organism, or can hold calcium phosphate supplied from the additive mainly composed of calcium phosphate. In particular, the bone material component or calcium phosphate can be held not only in the surface layer of the sintered body but also inside the sintered body. Accordingly, when the bone material component or calcium phosphate is dissolved by the organic acids from roots of plants to form a nourishing water, this nourishing water is easily held in pores of the sintered body to hardly escape from the pores of the plant-cultivating artificial material. Thus, the sintered body can hold the nourishing water throughout a long term because of the strong structure provided by sufficient hardness having a hardness to hardly be broken.

A fourth aspect of the present invention provides a moderate process for producing the plant-cultivating artificial material of the second aspect. In the fourth aspect of the present invention, a process for producing a plant-cultivating artificial material comprises the steps of: (1) preparing a base material containing at least one of silica and alumina as a major component and having a powder or granular shape, and preparing a mixing substance mainly composed of at least one of bone material and an additive, the bone material containing calcium phosphate and gathered from an organism, the additive mainly composed of calcium phosphate; (2) mixing the base material with the mixing substance to obtain a mixture, and forming a green body by the mixture; (3) heating the green body in a heated atmosphere to sinter a porous sintered body to hold a bone material component from the bone material or to hold calcium phosphate from the additive in the porous sintered body; and (4) bringing the porous sintered body into contact with a liquid including a nitric add component thereby holding the nitric acid component in the sintered body, and thereby constituting a plant-cultivating artificial material.

In the fourth aspect of the present invention, the porous sintered body can hold the nitric acid component, besides the bone material component and calcium phosphate. In particular, the nitric add component, the bone material component, and calcium phosphate can be held not only in the surface layer of the sintered body but also inside the sintered body.

The nitric add is dissolved by water to form the nitric acid solution. The bone material component supplied from the bone material being held on the sintered body, or calcium phosphate supplied from the additive mainly composed of calcium phosphate—such can be dissolved by the organic acids or by the nitric acid solution so as to form nourishing water. This nourishing water is easily held in pores of the sintered body to hardly escape from the pores of the plant-cultivating artificial material. Also, having a hardness to hardly be broken, the sintered body constituting the plant-cultivating artificial material can hold the nourishing water throughout a long term.

In the first and second aspects of the present invention, since the sintered body is porous, it sufficiently has a water-holding ability and an air-ventilating ability to promote growth of plants. The bone material component supplied from the bone material, or calcium phosphate supplied from the additive mainly composed of calcium phosphate—such can be hardly dissolved by water; such can be dissolved by organic adds secreted from roots of plants. The nourishing water including such is easily held in pores of the sintered body. Hence, the nourishing water hardly escapes from the pores of the plant-cultivating artificial material. So, the plant-cultivating artificial material can advantageously be used as a fertilizer to promote growth of plants.

Also, the sintered body constituting the plant-cultivating artificial material, having a sufficient hardness. So, the sintered body maintains nicely and holds the nourishing water containing the bone material components or calcium phosphate for a long time.

In the second aspect of the present invention, since the plant-cultivating artificial material holds the nitric add component, besides the bone material component supplied from the bone material, or besides calcium phosphate supplied from the additive composed of calcium phosphate. The nourishing water includes the nitric acid component besides the bone material component or calcium phosphate. This nourishing water is easily held in pores of the sintered body; so, it hardly escapes from pores of the plant-cultivating artificial material. Thus, the plant-cultivating artificial material can advantageously be used as a fertilizer to promote growth of plants.

In the third aspect of the present invention, the porous sintered body can hold the bone material component supplied from the organism or calcium phosphate supplied from the additive mainly composed of calcium phosphate. In particular, the bone material component or calcium phosphate can be held not only in the surface layer of the sintered body but also inside the sintered body. When the bone material component or calcium phosphate is dissolved by the organic acids secreted from roots of plants to form the nourishing water, this nourishing water is easily held in the pores of the sintered body and hardly escapes from the pores of plant-cultivating artificial material. Thus, the plant-cultivating artificial material can advantageously be used as a fertilizer to promote growth of plants. The plant-cultivating artificial material can hold the nourishing water throughout a long term, since it has a hardness to hardly be broken.

In the fourth aspect of the present invention, the porous sintered body can hold the nitric acid component besides the bone material component and calcium phosphate. In particular, not only in the surface layer of the sintered body but also inside the sintered body can hold these easily.

When the nitric add component is dissolved by water to form a nitric add solution, or when the bone material component or calcium phosphate is dissolved by the organic add or by the nitric add solution, the nourishing water containing such is easily held in the pores of the sintered body to hardly escape from the pores of the plant-cultivating artificial material. Therefore, the plant-cultivating artificial material can advantageously be used as a fertilizer to promote growth of plants. Also, the sintered body constituting the plant-cultivating artificial material can hold the nourishing water throughout a long term, since it has a hardness to hardly be broken.

PREFERABLE MODES OF THE PRESENT INVENTION

According to the plant-cultivating artificial material of the present invention, the sintered body contains at least one of silica and alumina as a major component Therefore, the sintered body may contain only one or both of silica and alumina as a major component. Further, the sintered body may contain at least one of magnesium oxide, iron oxide, manganese oxide, sodium oxide, potassium oxide, etc.

The sintered body concerning the present invention is porous, having a plurality of pores. Porosity rate, pore-distribution, and average pore diameter in the sintered body affect the water-holding ability, the water-conducting ability, the air-ventilating ability, and the breeding condition of microorganisms; they may be chosen depending on the kind of base material and usage of the plant-cultivating artificial material. The base material may sometimes include burning substances. The burning substance may be organic substances, activated carbon coal powder, etc. Varying size and distribution of the burning substances, the bone material or the additives mainly composed of calcium phosphate, so it will adjust a pore diameter and a distribution of pore diameter in the sintered body. The reason is that the burning substances are burnt and lost to form pores. Also, parts of the bone material are melted or burnt to form pores. The pore is preferably a continued pore in comparison with an isolated pore.

As for the porosity rate of the sintered body, the upper limit may be set, for example, at 80%, 70%, 60%, 50%, 40%, or 30% by volume ratio; the lower limit can be set for example, at 5%, 10%, 15%, 20%, 30%, or 40%. The upper limit and the lower limit are not limited to these. Therefore, the porosity rate of the sintered body may be set, for example, in a range of 5%–80%, or in a range of 10%–70% at volume ratio. An increase of the porosity rate generally improves the water-holding ability, the water-conducting ability, and the air-ventilating ability, although it decreases hardness of the plant-cultivating artificial material.

As for the pore distribution of the sintered body, the upper limit may be set for example, at 3 mm, 2 mm, 1 mm, 500 $\mu$m, 200 $\mu$m, 100 $\mu$m, 50 $\mu$m, or 30 $\mu$m; the lower limit may be set, for example, at 0.01 $\mu$m, 0.1 $\mu$m, 0.5 $\mu$m, 1 $\mu$m, 5 $\mu$m, 10 $\mu$m, or 20 $\mu$m. The upper limit and the lower limit of the pore distribution are not limited to these. The pore distribution of the sintered body can be set for example, in a range of 0.01 μm–3 mm, in a range of 0.1 μm–1 mm, or in a range of 1 μm–500 μm As for the average diameter of the pore of sintered body, the upper limit may be set, for example, at 3 mm, 1 mm, 500 μm, 200 μm, 100 μm, or 50 μm; the lower limit may be, for example, at 0.01 μm, 0.1 μm, 0.5 μm, 1 μm, or 10 μm. The upper limit and the lower limit are not limited to these. The average diameter concerning the pore of the sintered body is set, for example, in a range of 0.01 μm–3 mm, in a range of 0.1 μm–1 mm, or in a range of 1 μm–500 μm. The average diameter may be defined as a mode diameter which means the most frequent diameter, or as a median diameter which means the middle value between the upper limit and the lower limit.

The sintered body may have a plurality of peaks showing a frequency of pore diameter in pore-distribution. The number of peaks may be three or two. In the case where the burning substance and the bone material are mixed with the base material, the difference between the burning substance and the bone material in powder-diameter will provide a plurality of peaks showing a frequency of pore-diameter in the sintered body.

The total amount of Ca (calcium) and P (phosphorus) may be varied depending on usage of the plant-cultivating artificial material, etc. According to a preferable mode, the total amount of Ca (calcium) and P (phosphorus) may be set in a range of 3%–50% in weight ratio, when the plant-cultivating artificial material is set to be 100%.

As for the total amount of the above mentioned Ca (calcium) and P (phosphorus), the lower limit may be, for example, 5% or 7% in weight ratio; the upper limit may be, for example, 45%, 40%, 35%, 30%, or 25% in weight ratio. The upper limit and the lower limit are not limited to these. The bone material in a preparing step may be in a raw state, in a heated state with steam, or in a burned state.

According to the second aspect of the present invention, the sintered body holds the nitric acid component It generally is held having $NO_3^-$ ion The amount of the nitric acid component, $NO_3^-$ ion, being held in the sintered body, can be decided depending on situations of the pore, applications of the plant-cultivating artificial material, etc. According to the preferable mode, as for the amount of $NO_3^-$ ion, the lower limit may be set, for example, at 0.2%, 0.5%, 1%, or 5% by weight ratio; the upper limit may be set for example, at 9%, 10%, 13%, 15%, or 30% by weight ratio, when the plant-cultivating artificial material is set to be 100%. The lower limit and the upper limit are not limited to these. Therefore, the amount of $NO_3^-$ ion may be, for example, in a range of 0.2%–30%, in a range of 0.2%–15%, or in a range of 1%–10% by weight ratio.

The third aspect of the present invention provides a moderate process for producing the plant-cultivating artificial material holding the bone material component. According to the third aspect of the present invention—the mixing and forming step—It is to mix the base material containing at least one of silica and alumina as a major component which has a powder form or granular shape with the mixing substance that is mainly composed of at least one of bone material and the additive. In this mixture, a mixing rate and a kind of the base material can be chosen depending on a required amount of bone material, a required amount of calcium phosphate, types of plant to be grown, etc.

For example, the mixing rates of volume are as follows:
(base material:bone material )=(20: 80)–(95: 5) in particular,
(base material:bone material )=(40: 60)–(80: 20)

The mixing ratio may be set to be the same range between the base material and the additive.

The mixing and forming step permits a kneading machine to be used. In the mixing and forming step, it is desirable to also add water for efficient kneading. The base material may be wastes being scrapped in factories or in scrapping fields such as casting foundries. The wastes may be dust-wastes, sludge-wastes. Dust wastes may be collected by dust collectors. The average particle size of the dust-wastes may be roughly in a range of 1 μm–200 μm, or in a range of 3 μm–50 μm. The sludge wastes may be sludge in sewerage of factories such as casting foundries. The sludge wastes may be sludge precipitated in tanks for storing liquidus wastes, etc. Generally, the sludge particle is smaller than the dust particle in average particle size.

The additive mainly composed of calcium phosphate to be used in the present process means either artificial products made of calcium phosphate itself or artificial products containing calcium phosphate as a major component.

The bone material in a preparing step, as described above, may be in a raw state, in a heated state with steam, or in a burned state. The bone material may be selected from beasts, fishes, and so on. The beast may be at least one selected from the group including cattle, horses, sheep, chickens, and so on. The bone material generally contains calcium phosphate as a main component, sometimes including protein. The bone material may be crushed to form a powder shape, a granular shape, or a shard shape, depending on applications of the plant-cultivating artificial material, etc. The size of the base material, the size of the bone material, and the distribution of size thereof—such affects pore size of the sintered body constituting the plant-cultivating artificial material. The pore of the sintered body generally increases in size when the base material, the powder of the bone material, and calcium phosphate are large in size. The pore of the sintered body decreases in size when the base material, the bone material powder, and calcium phosphate are small in size.

In the mixing and forming step, the green body is formed in a predetermined shape. The green body may be in a granular shape or in a pellet shape, and it may sometimes be in a block shape. In the mixing and forming step, the green body may have a granular shape or a pellet shape by means of frictional forces caused by stirring blades. The green body may have a granular shape or a pellet shape by use of forming dies for compression. Also, the green body may be formed in a cylinder shape or in a rough cylinder shape by cutting a continued rod in series in a length direction thereof The continued rod may be obtained by the extrusion method.

In the heating step, the green body is heated in a heated atmosphere to form a porous sintered body so as to produce the plant-cultivating artificial material. The heating temperature can be varied depending on size and composition of the green body, existence of a baking auxiliary, strength being requested as the plant-cultivating artificial material, etc. As for the heating temperature, the lower limit may be set, for example, at 400° C., 500° C., 600° C., 700° C., 800° C., or 900° C.; the upper limit may be set, for example, at 1300° C., 1200° C, 1100° C., 1000° C, or 900° C. The upper limit and the lower limit of the heating temperature are not limited to these. Therefore, the heating temperature may be in a range of 400° C.–1300° C., in a range of 500° C.–1200° C., or in a range of 700° C.–1100° C.

When the green body is sintered, it is hardened to form the sintered body and hardly be broken. The heating time is chosen depending on heating temperature, size of the green body, and hardness being requested as the plant-cultivating artificial material. So, the heating time may be, for example, in a range of 10 minutes–10 hours, in a range of 20 minutes–5 hours, or in a range of 1 hour–2 hours. The heating time is not limited to these. In the case where the bone material contains protein and the like, it is assumed that parts or all of protein is lost during the burning process.

Average size of the plant-cultivating artificial material can be varied depending on applications thereof. As for the average size, the lower limit may be set, for example, at 50 $\mu$m, 200 $\mu$m, 1 mm, or 2 mm; the upper limit may be set, for example, at 50 mm, 20 mm, 15 mm, 10 mm, 3 mm, or 1 mm. The upper limit and the lower limit of the average size are not limited to these. Therefore, the average size of the plant-cultivating artificial material may be, for example, in a range of 50 $\mu$m–50 mm, in a range of 200 $\mu$m–20 mm, or in a range of 1 mm–15 mm.

The process of the fourth aspect provides a moderate process for producing the plant-cultivating artificial material holding the nitric add component besides a bone material component supplied from the bone material, or besides calcium phosphate supplied from the additives mainly composed of calcium phosphate. The process of fourth aspect is basically similar to that of the third aspect in the mixing, forming and heating steps. The difference between the fourth aspect and the third aspect is as follows:

After the porous sintered body is formed by sintering in the heating step, the sintered body is brought into contact with liquid including the nitric acid component This allows the nitric acid component to infiltrate into the pores of the sintered body. Further, this allows the nitric acid component to be held in pores of the sintered body. The liquid including the nitric acid component may be nitric acid aqueous solutions. Also, when the sintered body is brought into contact with the liquid including the nitric acid component, parts of the bone material component of the sintered body are dissolved by the liquid so as to form pores; accordingly, the plant-cultivating artificial material increases in porosity rate.

The concentration of the nitric acid in the liquid can be chosen depending on the target amount of nitric add component to be held in the sintered body. The held amount of the nitric acid component generally is increased in the sintered body, when the concentration of nitric acid is higher in the liquid. As for the concentration of the nitric acid in the liquid, the upper limit may be set, for example, at 20N, 10N, 5N, 3N, or 1N; the lower limit may be set for example, at 0.01N, 0.1N, 0.5N, or 1N. The upper and lower limits of concentrations of the nitric acid component are not limited to these. The term of "N " herein means normality.

In bringing the sintered body into contact with the liquid including the nitric acid component, the sintered body may be soaked in the liquid, or the liquid may be sprayed to the sintered body.

In the fourth aspect of the present invention, the porous sintered body can hold the nitric add component, besides the bone material component supplied from the bone material, or besides calcium phosphate supplied from the additive. In particular, not only the surface layer of the sintered body but also the inside of the sintered body can hold these. When the nitric add component is dissolved by water to form nitric add solutions, the bone material components or calcium phosphate is dissolved by the organic adds or by the nitric add solutions so as to form the nourishing water, the nourishing water is easily held in the pores of the sintered body and hardly escapes from the pores of the plant-cultivating artificial material.

The plant-cultivating artificial material may be used as a soil-improving material to be buried in soil, or it may be used together with a nourishing solution without being buried in soil.

BRIEF DESCRIPTION OF THE DRAWINGS

A more complete appreciation of the present invention and many of its advantages will be readily obtained as the same becomes better appreciated by reference to the following detailed description when considered in connection with the accompanying drawings and detailed specification, all of which forms a part of the disclosure:

FIG. 2 illustrates a graph of measured results exhibiting dried weights of plants, vegetables of "Komatsuna";

FIG. 3 illustrates a graph of measured results exhibiting height of plants, grass;

DETAILED DESCRIPTION OF THE PREFERRED EMBODIMENTS

Preferred embodiments will be described hereinafter with reference to drawings.

First Preferred Embodiment

In a mixing and forming step according to the present embodiment, there was used a base material having a powder shape or a granular shape and being formed of scrapped casting sand, namely, dust-wastes collected by use of dust collectors disposed in casting foundries. The scrapped casting sand generally contains silica and alumina as a major component, in addition, magnesia, iron oxide, and organic substances. This base material was mixed with powder of bone material of organisms and water so as to form a slurry mixture having a fluidity. The organisms were beasts—cattle. In the present embodiment, water was added to the base material at about 10%–40% in weight ratio, when the base material was set to be 100%. The bone material generally contains calcium phosphate as a major component.

Figure 1:
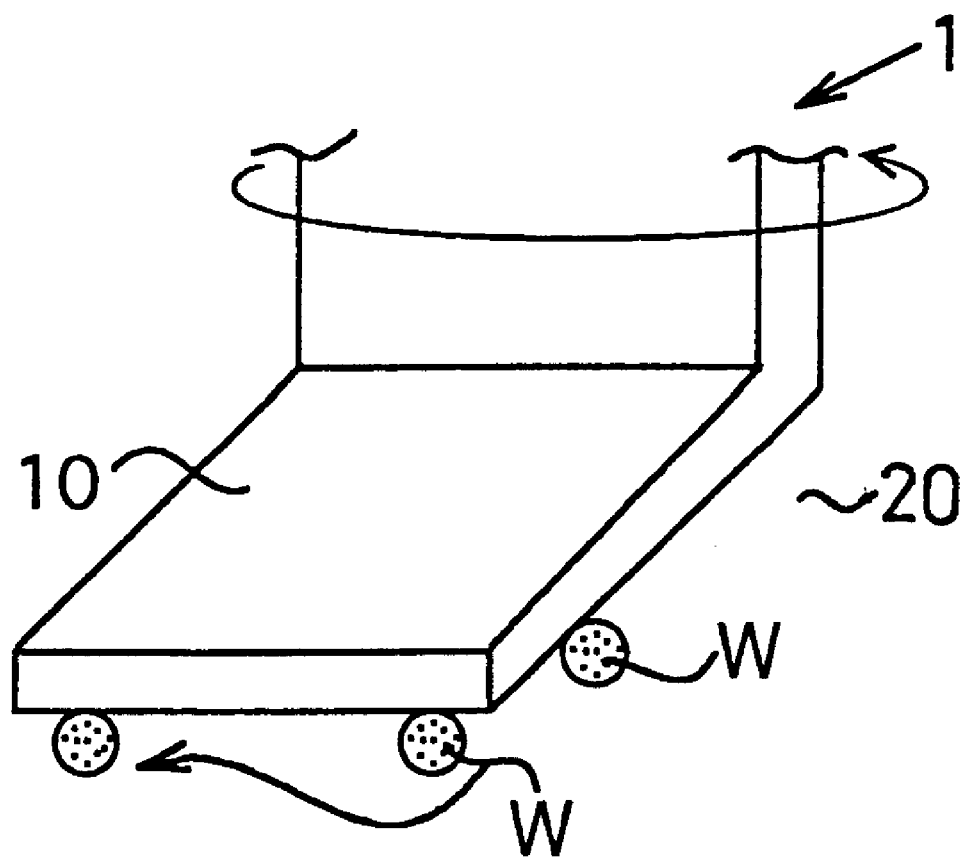
FIG. 1 illustrates a perspective view schematically of a situation in which green body having a pellet shape are formed by rotation of a stirring blade.

The mixture was formed to produce a green body having a granular shape. Concretely, as shown in FIG. 1, there was used a kneading machine 1 having a container and a rotatable stirring blade 10 inside. The stirring blade 10 was rotated in such a manner that the mixture was inserted in the container and that stirring blade 10 approached a bottom wall 20 of the container. The base material and the bone material were rolled with each other so as to gradually form green bodies (W) by frictional forces between the mixture and the stirring blade 10, by frictional forces between the mixture and the bottom wall 20, and by the like. Size of green bodies(W) was chosen in a range of 1 mm–20 mm. Afterwards, the green bodies were dried.

The heating step was carried out after dry. In the heating step, the green bodies were inserted into a baking furnace to be heated in the air atmosphere to be sintered. Target temperature of the heating step was set at 800° C., and the heating time was set for 8 hours. This heating can produce porous sintered bodies. The organic substances being included in the green bodies were burned in heating so as to form pores. Also, the bone material was melted or burned to form pores. This process can produce the pores. Here, communicated pores were produced more than isolated pores. The communicated pores are continued with each other—opening pores being opened at the surface of the sintered body. The isolated pores are isolated to each other—closing pores. The sintered body produced in the present embodiment had a large number of pores, being porous. The sintered body generally was in the 30–65 volume % range in porosity rate, based on a mercury penetration method.

The above-mentioned process produced a number of plant-cultivating artificial materials having a granular shape. The size of the plant-cultivating artificial material generally decreases more than the green body because of shrinkage after sintering. The plant-cultivating artificial material concerning the present embodiment had: (1) a sintered body containing silica and alumina as a major component with a granular shape; and (2) a bone material component being held in the sintered body. When present inventors observed the state of one particle of the plant-cultivating artificial material by using an electron microscope, there were dispersion of a large number of powder particles of bone material in the sintered body; and there were also dispersion of a large number of pores formed by melting and burning in the sintered body.

When this plant-cultivating artificial materials were buried as a soil-improving material in soil the plants early grew. When this plant-cultivating artificial materials were used under a mat so as to cultivate plants, the plants early grew. This reason is assumed as follows: The sintered body holds calcium phosphate, a major element constituting the bone material. Thus, when calcium phosphate is dissolved by organic acids secreted from roots of plants to form nourishing water, the nourishing water including calcium phosphate is easily held in the pores of the sintered body and hardly escapes from the pores of the plant-cultivating artificial material.

Second Preferred Embodiment

The second preferred embodiment is basically similar to the first preferred embodiment. In a mixing and forming step, there was used base material having a powder shape or a granular shape—scrapped casting sand mainly composed of dust-wastes collected by use of dust collectors in casting foundries. The scrapped casting sand—the base material contained silica and alumina as a major component, in addition, magnesia, iron oxide, and organic substances. This base material was mixed with powder of the bone material of organisms—beasts (cattle)—so as to form a mixture having a powder shape. The mixture was formed to produce a number of green bodies with a granular shape.

In the heating step, the green bodies were burnt in the air atmosphere to be sintered by use of a baking furnace. Target temperature of the heating step was set at 800° C., and the heating time was set for 8 hours. This heating step can produce porous sintered bodies. The organic substances being included in the green body were burnt in the heating step to form pores. Also, the bone material being included in the green body was melted or burnt to form pores. Such process can much produce pores—communicated pores. These pores were continued with each other to be opened at the surface of the sintered body. The sintered body produced in the present embodiment had a large number of pores, being porous. The sintered body generally was set in the 30–65 volume % range in porosity rate, based on the mercury penetration method.

After the heating step, the contacting step was carried out. In contacting step, the sintered body was soaked in a nitric acid aqueous solution having a concentration of 0.1N for a predetermined hour, 1 hour. Thus, the nitric acid aqueous solution infiltrated and was held inside pores of the sintered body. When the sintered body was soaked in nitric add aqueous solutions, the bone material was partially dissolved so as to form pores, thereby increasing the porosity rate of the sintered body. Afterwards, the sintered body was dried. When the porosity rate of sintered body after drying was measured on the basis of the mercury penetration method, the porosity rate was in the 40–80 volume % range.

Figure 8:
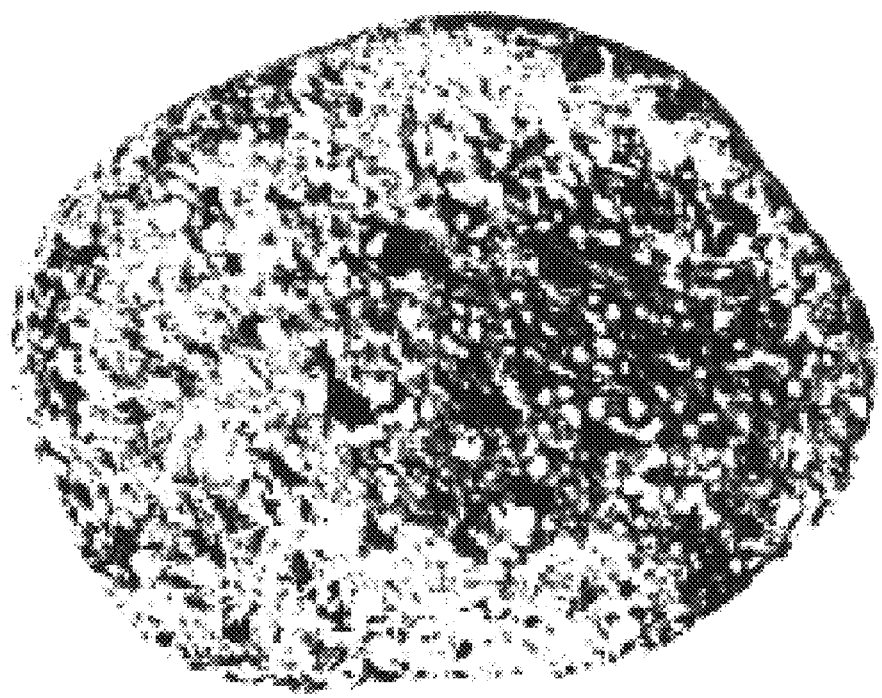
FIG. 8 shows a cross-section of one particle of a plant-cultivating artificial material produced based on a second preferred embodiment.

FIG. 8 shows a photograph of one sample of the plant-cultivating artificial material, having a diameter of about 9 mm–12 mm, produced in the second preferred embodiment. FIG. 8 shows a cut section of one particle of the plant-cultivating artificial material. This photograph shows that whitish micro granular portions represent the bone material. This photograph shows that the plant-cultivating artificial material has a number of micro pores. When the porosity rate of sintered body was measured, the porosity rate was in the 40–55 volume % range.

In such a way, the above- mentioned process produced a number of plant-cultivating artificial materials of First Preferred Embodiment The plant-cultivating artificial material of the present embodiment had: (1) a sintered body containing silica and alumina as a major component; (2) a bone material component corresponding to calcium phosphate being held in the sintered body; and (3) a nitric acid component being held in the sintered body.

When these plant-cultivating artificial materials were buried as a soil-improving material in soil, the plants early grew. Also, when these plant-cultivating artificial materials were used under a mat to cultivate plants, the plants early grew. This reason is assumed as follows: The sintered body holds a nitric acid component besides bone material, namely, calcium phosphate. The nitric acid component is dissolved by water to form nitric acid solutions. Thus, when calcium phosphate constituting the bone material is dissolved by organic acids secreted from roots of the plants or by nitric acid solutions so as to form nourishing water, the nourishing water including calcium phosphate is easily held in the pores of the sintered body and hardly escapes from the pores of the plant-cultivating artificial material.

EXAMPLE 1

Present inventors changed the size of the plant-cultivating artificial material, while setting a mixing ratio of the bone material to be at 30% at volume ratio in the mixture, thereby producing Samples No.1–No.3. The mixing ratio means as follows:

base material:bone material=70vol %: 30 vol %

In addition, present inventors carried out a nitric acid treatment with respect to the same kind of the plant-cultivating artificial material to produce Samples No.1B–No.3B. In size, Sample No.1 was 1.5 mm–3mm, Sample No.2 was 5 mm–7mm, and Sample No.3 was 7 mm–12 mm. Here, Samples No.1–No.3 did not undergo the nitric acid treatment In size, Sample No.1B was 1.5 mm–3 mm, Sample No.2B was 5 mm–7 mm, and Sample No.3B was 7 mm–12 mm. Here, Samples No.1B–No.3B were soaked in a nitric acid aqueous solution having a concentration of 0.1N for 1 hour, and they were dried after the nitric add treatment Then, present inventors examined composition of each of Samples. Table 1 shows measured results of the composition, Data—the amount of $SiO_2$, $Al_2O_3$. . . S, Zn, and the amount of Ca (calcium) and P (phosphorus) in calcium phosphate—were based on X-ray fluorescence analysis. The total amount of Ca and P being held in the sintered body constituting the plant-cultivating artificial material—it is corresponding to the total amount of Ca and P constituting the bone material being held in the sintered body, in our guess. This total amount was obtained as follows:

"α1" exhibits the total amount of Ca and P in the plant-cultivating artificial material including the bone material.

"α2" exhibits the total amount of Ca and P in the plant-cultivating artificial material not including the bone material and having the same composition.

The present inventors obtained a value of (α1–α2), namely, a value obtained by subtracting α2 from α1, and set the value as the total amount of Ca and P in calcium phosphate being held in the sintered body constituting the plant-cultivating artificial material.

As appreciated from Table 1, in weight ratio, silica ($SiO_2$) was set at about 50%–62% (55.50%–61.00%), alumina ($Al_2O_3$) was set at about 10%–20% (13.80%–15.50%), magnesia (MgO) was set at about 2%–3% (2.21%–2.48%), and iron oxide (FeO) was set at about 4%–7% (4.20%–5.90%). In addition, the amount of Ca and P of calcium phosphate was set at about 5%–17% (6.94–15.00%). MnO, $Na_2O$, $K_2O$ S, and Zn were also included in the sintered body.

As appreciated from Table 1, for the total amount of Ca and P of calcium phosphate, Sample No.1 contained 12.03% in weight ratio, Sample No.2 contained 8.17% in weight ratio, Sample No.3 contained 15.00% in weight ratio, Sample No.1B, contained 10.38% in weight ratio, Sample No.2B contained 6.94% in weight ratio, and Sample No.3B contained 7.33% in weight ratio.

As for Samples No.1–No.3, because of the absence of the nitric acid treatment, as appreciated from Table 1, the amount of $NO_3^-$, nitric acid ion, was set at about 0.05%–0.25% (0.051%–0.126%) in weight ratio. It is assumed that Samples No.1–No.3 not undergoing the nitric add treatment indicate the including of $NO_3^-$ because of ash remained therein. Samples No.1B–No.3B undergoing the nitric acid treatment held much $NO_3^-$, nitric acid ion, namely, about 0.5%–0.9% (0.667%–0.728%) in weight ratio.

Present inventors also varied the mixing ratio of the powder of bone material to 50%, 30%, and 10% by volume, respectively, so as to produce the plant-cultivating artificial materials of Samples No.11–No.13 having a diameter of 7 mm–12 mm. These ratio were as follows:

50%: base material: bone material=50vol %:50 vol %
30%: base material: bone material=70vol %:30 vol %
10%: base material: bone material=9 vol %:10 vol %

Present inventors similarly produced the plant-cultivating artificial material of Samples No.11B–No.13B having a diameter of 7 mm–12 mm by carrying out the nitric acid treatment. As for the mixing ratio (volume ratio ) of the bone material in the mixture, Sample No.11 was set at 50%, Sample No.12 was set at 30%, Sample No.13 was set at 10%, Sample No.11B was set at 50%, Sample No.12B was set at 30%, and Sample No.13B was set at 10%.

Present inventors did not carry out the nitric acid treatment with respect to Samples No.11–No.13. Samples No.11B–No.13B were soaked and brought into contact with the nitric acid aqueous solution having a concentration of 0.1N for 1 hour—the carrying out of a nitric acid treatment. Then, present inventors examined composition of each Samples. Table 2 shows measured results of composition.

As appreciated from Table 2, in weight ratio, silica ($SiO_2$) was set at about 39%–62% (40.50%–60.30%), alumina ($Al_2O_3$) was set at about 7%–17% (8.56%–15.90%), magnesia (MgO) was set at about 1.7%–3% (1.89%–2.51%), and iron oxide (FeO) was set at about 2%–7% (2.50%–5.17%). In addition, the total amount of Ca and P of calcium phosphate was set at about 5%–40% (7.13%–37.79%). MnO, $Na_2O$, $K_2O$, S, and Zn were also included in the sintered body.

As appreciated from Table 2, in Sample No.11, burned bone material having a specific gravity of 1.1 was mixed at 50% by volume ratio; so, the total amount of Ca and P of calcium phosphate was 37.79% in weight ratio. In Sample No.12, the bone material was mixed at 30% by volume ratio; so, the total amount of Ca and P of calcium phosphate was 15.00% in weight ratio. For Sample No.13, the bone material was mixed at 10% by volume ratio; so, the total amount of Ca and P of calcium phosphate was 8.97% in weight ratio.

Also, in Sample No.11B, the bone material was mixed at 50% by volume ratio; so, the total amount of Ca and P of calcium phosphate was set at 36.24% in weight ratio. In Sample No.12B, the bone material was mixed at 30% by volume ratio; so, the total amount of Ca and P of calcium phosphate was set at 13.79% in weight ratio. In Sample No.13B, the bone material was mixed at 10% by volume ratio; so, the total amount of Ca and P of calcium phosphate was set at 7.13% in weight ratio. This result indicates that the total amount of Ca and P increases in the sintered body as a mixing ratio of bone material increases.

Further, as for Samples No.11–No.13 not undergoing the nitric acid treatment, the amount of $NO_3^-$, nitric add ion was set at about 0.1%–0.2% (0.111%–0.185%) in weight ratio. On the other hand, as for Samples No.11B–No.13B undergoing the nitric ad treatment, the amount of $NO_3^-$, nitric acid ion was as large as about 0.5%–0.9% (0.682%–0.806%) in weight ratio.

While using plant-cultivating artificial materials of Samples No.50–No.53 corresponding to the same kind of Sample No.2, present inventors varied concentrations of nitric acid solutions as follows: 5N, 1N, 0.1N, and 0.01N, respectively. Then, the present inventors: (1) soaked Samples for washing in each of nitric acid solutions for 1 hour, respectively; (2) dried Samples taken out the nitric acid solution at 110° C. for 24 hour; and (3) examined the amount of nitric add component being held in Samples after dry.

Table 3 shows measured results of the amount of nitric acid component. As shown in Table 3, nitric acid ion, $NO_3^-$ was held at about 18.36% in Sample No.50 when the concentration of nitric add aqueous solution was 5N. Nitric acid ion, $NO_3^-$ was held at about 3.65% in Sample No.51 when the concentration of nitric acid aqueous solution was 1N. Nitric add ion, $NO_3^-$ was held at about 0.66% in the Sample No.52 when the concentration of nitric add aqueous solution was 0.1N. Nitric acid ion, $NO_3^-$ was held at about 0.25% in Sample No.53 when the concentration of nitric acid aqueous solution was 0.01N. These results indicate that the amount of the nitric acid ion, $NO_3^-$, increases in the sintered body as the concentration of nitric add is higher in the nitric add aqueous solution.

Present inventors estimated the amount of $NO_3^-$, a nitric add component, being held in the plant-cultivating artificial material as follows:

Present inventors crushed the plant-cultivating artificial material, and soaked the crushed powder in ion exchange water then vibrated them for about 1 hour at about 200 rpm. Accordingly, the nitric acid component held in the crushed powder was dissolved into the ion exchange water. Then, present inventors measured the dissolved amount of the nitric add component by using a nitric add ion meter, thereby obtaining the weight of nitric add ion with respect to 100 g of the plant-cultivating artificial material, and thereby obtaining the held amount of $NO_3^-$ (weight %).

EXAMPLE 2

Present inventors examined a relationship between the concentration of the nitric add aqueous solution and the amount of the nitric acid component being held in the plant-cultivating artificial material. Here, the present inventors: (1) prepared various nitric add aqueous solutions having 13N, 5N, 1N, 0.1N, and 0.01N, respectively; (2) prepared a plurality of the plant-cultivating artificial materials of Sample No.2 (see Table 1 ) which was prepared in Example 1; (3) soaked each of the plant-cultivating artificial materials in each of the nitric acid aqueous solutions for 1 hour respectively, so as to hold a nitric add component in the plant-cultivating materials; and (4) measured the amount of nitric acid component being held in each of the plant-cultivating artificial materials.

In other words, in such measuring, present inventors: (1) collected the plant-cultivating artificial materials soaked in each of the nitric acid aqueous solutions; (2) dried them at 110° C. for 24 hours; (3) inserted them into ion exchange water (100 ml), respectively; (4) vibrated them with the ion exchanged water at 200 rpm for 1 hour so as to extract a nitric add component into the ion exchange water; (5) diluted the ion exchanged water with water at a predetermined diluting rate so as to obtain a diluted solution; and (6) measured the amount of nitric acid ion being included in the diluted solution, not by use of the ion meter but by use of brucine absorptiometry method (JIS K 0102 43.2.4). Then, present inventors obtained the amount of nitric acid ion being held in 100 g of the plant-cultivating artificial material by multiplying the diluting rate.

In the test mentioned above, the amount of the nitric acid component was measured in such a manner that the plant-cultivating artificial materials just having a granular shape— an uncrushed case—were inserted in the ion exchange water. Further, in another measuring present inventors: (1) sufficiently crushed the plant-cultivating artificial material soaked in each of nitric add aqueous solutions by using a mortar to produce powder; (2) inserted its powder into another ion exchanged water; and (3) similarly measured the amount of nitric add ion based on the brucine absorptiometry method.

Table 4 shows measured results with the diluting rate with respect to the crushed powder case and the uncrushed case. As understood from Table 4, it is seen that the nitric acid component is higher in the amount being held in the plant-cultivating artificial material as the nitric acid aqueous solution increases higher in concentration. Also, Table 4 shows that the crushed powder case of the plant-cultivating artificial material permits the amount of the nitric add component to be detected highly in comparison with the uncrushed case. This fact suggests that the plant-cultivating artificial material having a granular shape holds a large amount of nitric acid components even when it is vibrated in water. In the case where the plant-cultivating artificial material is actually used, although the plant-cultivating artificial material is influenced under rain water and so on, the nitric acid component does not escape from the pores of the plant-cultivating artificial material in a short time. So, the plant-cultivating artificial material concerning the present invention can hold a nitric acid component throughout a long period.

EXAMPLE 3

In Example 3, present inventors examined a transition in a holding ability that the plant-cultivating artificial material holds a nitric acid component. That is to say, present inventors: (1) prepared a nitric acid aqueous solution with the concentration of 1N; (2) soaked the plant-cultivating artificial materials of Sample No.2 prepared in Example 1 in the nitric add aqueous solution for about 1 hour; (3) collected the plant-cultivating artificial materials soaked in the nitric acid aqueous solution; (4) dried them at 110° C. for 24 hours; and (5) inserted them into ion exchange water (100 ml) so as to extract a nitric acid component being held in the plant-cultivating artificial materials into the ion exchange water by vibrating them at 200 rpm for 1 hour, as a first extraction. Then, present inventors diluted the ion exchange water at a predetermined diluting rate to obtain a diluted solution, and they used similarly method to measure the amount of nitric acid ion being stored in the diluted solution by use of brucine absorptiometry method.

Further, present inventors: (1) dried the plant-cultivating artificial materials collected from the ion exchange water at 110° C. for 24 hours; (2) inserted them into another ion exchange water (100 ml) as a second extraction so as to extract a residual nitric acid component remained in the plant-cultivating artificial materials by vibrating them with the ion exchange water at 200 rpm for 1 hour; (3) diluted the ion exchange water at a predetermined diluting rate to obtain another diluted solution, and (4) similarly measured the amount of nitric acid ion stored in the another diluted solution by the brucine absorptiometry method. Afterwards, present inventors carried out a third extraction to measure the amount of nitric acid ion in the same way.

In the case of nitric acid aqueous solutions with concentrations of 0.1N and 0.01N, respectively, present inventors similarly carried out the first extraction, the second extraction, and the third extraction so as to measure the amount of nitric add component. Table 5 shows the measured results. As appreciated from Table 5, the nitric acid component was detected in both of the second extraction and the third extraction. This fact. means that the plant-cultivating artificial material can hold the nitric acid component throughout a long period in spite of influence of rain, thereby having a high water-holding ability in the present invention.

Cultivating Test 1

In Cultivating Test 1, present inventors: (1) inserted the plant-cultivating artificial materials of Sample No.2 holding calcium phosphate into a laboratory dish with a diameter of 90 mm; (2) piled three sheets made of glass fiber thereon; (3) placed 30 seeds of "Komatsuna" on the sheets; and (4) cultivated the seeds in an artificial weather vessel at 25° C. with a light period of 15 hours and a dark period of 9 hours. Also present inventors: (1) inserted the plant-cultivating artificial materials of Sample No.2B having calcium phosphate and a nitric acid component into another laboratory dish; (2) piled three sheets made of glass fiber thereon; (3) placed 30 seeds of "Komatsuna"; and (4) similarly cultivated them in the artificial weather vessel.

Also, as Comparison Test, present inventors selected commercial soil for organic farming instead of the plant-cultivating artificial material of the present invention, and cultivated seeds of "Komatsuna" in the artificial weather vessel in tha same condition described before. As another Comparison Test, present inventors selected "Isolite (registered trademark)" instead of the plant-cultivating artificial material of the present invention, and cultivated seeds of "Komatsuna" in the artificial weather vessel in the same condition described above. "Isolight (registered trademark)" has an elemental composition of 70% $SiO_2$, and 14.90% $Al_2O_3$ in weight ratio. As still another Comparison Test, without using the plant-cultivating artificial material of the present invention, present inventors piled three sheets in a laboratory dish storing only ion exchange water, and placed 30 seeds of "Komatsuna" on the sheets; and cultivated them in the artificial weather vessel in the same condition described above. As further another Comparison Test, without using the plant-cultivating artificial material of the present invention, the present inventors: (1) used a diluted solution in which "Flower Factory (registered trademark)" was diluted with water at a diluting rate of 1000, a suitable diluted ratio, so as to obtain a nourishing solution; (2) piled 3 sheets thereon; (3) placed 30 seeds of "Komatsuna" on the sheets; and (4) cultivated the seeds in the artificial weather vessel in tha same condition described above. "Flower Factory" contains nitric acid, phosphoric acid, and potassium.

After the 22nd day from the seeding, present inventors collected the grown plants of "Komatsuna", dried them at 80° C., and measured dried weights of then FIG. 2 shows measured results. In Comparison Test using the soil for organic farming, the son for organic farming considerably adhered to the root of the plants, not to be removed from the root sufficiently. Therefore, the dried weight was about 0.5 g, indicating a larger weight in comparison with the real weight because of the adhered soil.

As shown in FIG. 2, in case of the plant-cultivating artificial material holding calcium phosphate, the dried weight thereof exceeded 0.5 g, being a good result—this was similar to the case of the soil for organic farming. Also, in case of the plant-cultivating artificial material holding both of the nitric acid component and calcium phosphate, the dried weight thereof exceeded 0.7 g, being the largest Another Comparison Test, however, indicated a dried weight of less than 0.4 g, being smaller. This fact indicates that the plant-cultivating artificial material holding calcium phosphate is effective in growing plants. Especially, this fact indicates that the plant-cultivating artificial material holding calcium phosphate and nitric acid component is effective in growing plants.

Figure 4:
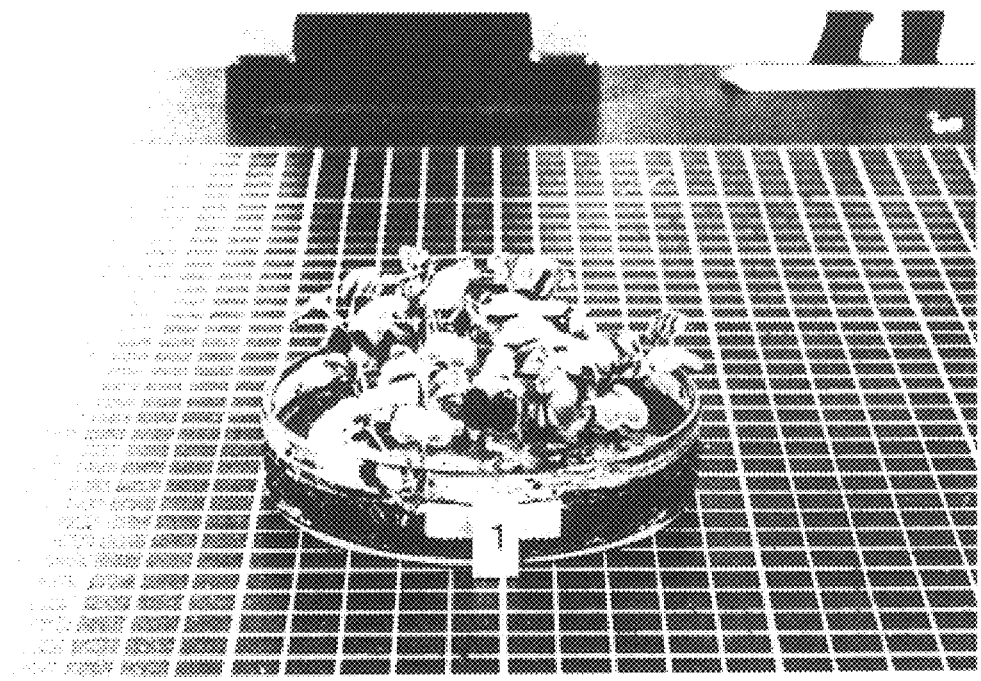
FIG. 4 shows a photograph exhibiting plants, vegetable of "Komatsuna", grown by use of soil for organic farming
Figure 5:
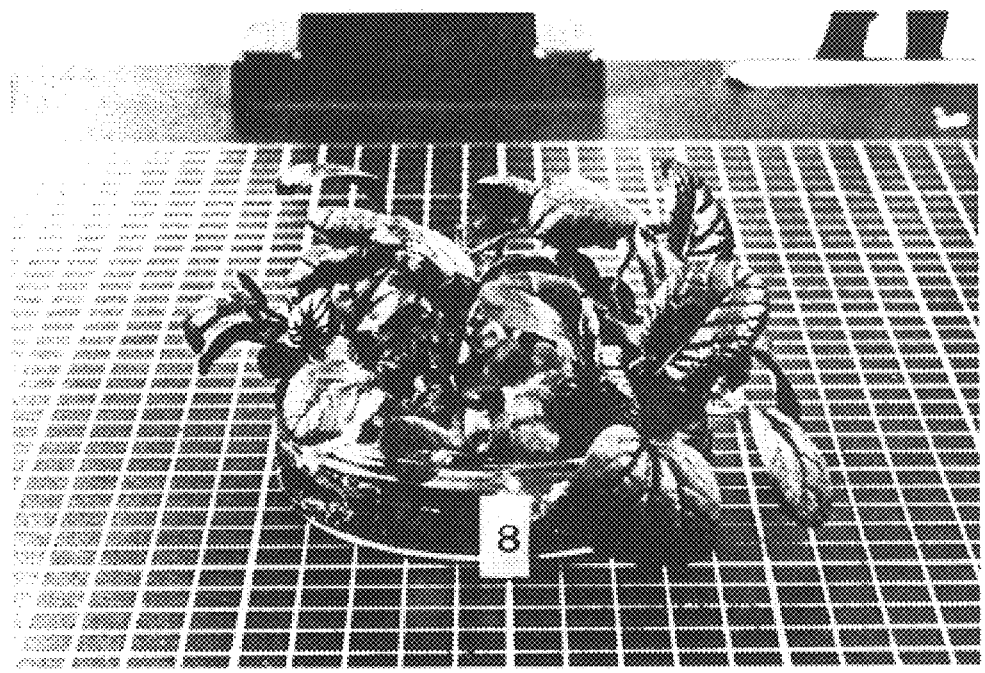
FIG. 5 shows a photograph exhibiting plants, vegetable of "Komatsuna", grown by use of a plant-cultivating artificial material concerning the present invention and holding both of a nitric acid component and calcium phosphate.

FIGS. 4 and 5 show the growth of "Komatsuna" after the 22nd day from the seeding. FIG. 4 shows the growth of "Komatsuna" in using the soil for organic farming. FIG. 5 shows the growth of "Komatsuna" in using the plant-cultivating artificial material of No.2B holding both of a nitric acid component and calcium phosphate. The comparison of FIG. 5 and 4 indicates that the plants grow early when the plant-cultivating artificial material is used to hold both of a nitric acid component and calcium phosphate.

Cultivating Test 2

In Cultivating Test 2, plants were similarly grown as described above. The plants were grass for a lawn instead of "Komatsuna". The growing conditions were basically similar to Cultivating Test 1.

In Cultivating Test 2, present inventors: (1) inserted the plant-cultivating artificial materials of Sample No.2 having calcium phosphate into a laboratory dish having a diameter of 90 mm; (2) piled three sheets made of glass fiber thereon; (3) placed 30 seeds of grass; and (4) cultivated the seeds in the artificial weather vessel at 25° C. with a light period of 15 hours and a dark period of 9 hours.

Also, present inventors: (1) inserted the plant-cultivating artificial materials of Sample No.2B having calcium phosphate and a nitric acid component into a laboratory dish; (2) placed 30 seeds of grass in the laboratory dish; and (3) cultivated the seeds in the artificial weather vessel. As further another Comparison Test, present inventors cultivated the seeds of grass in the artificial weather vessel under the similar condition using "Isolite (registered trademark)" and by using the soil for organic farming, respectively, instead of using the plant-cultivating artificial material of the present invention.

As still another Comparison Test, without using the plant-cultivating artificial of the present invention, present inventors piled 3 sheets in another laboratory dish storing only on exchange water; placed 30 seeds of grass in the laboratory dish; and cultivated the seeds in the artificial weather vessel under the similar condition described above.

As further another Comparison Test, present inventors: (1) without using plant-cultivating artificial of the present invention, selected a diluted solution in which "Flower Factory (registered trademark)" is diluted at a diluting rate of 1000, a suitable rate, to obtain a nourishing solution; (2) piled 3 sheets thereon in the laboratory dish; (3) placed 30 seeds of grass in the laboratory dish; and (3) cultivated the seeds in the artificial weather vessel under the same condition.

Present inventors measured a height of grass after the 35th day from the seeding. FIG. 3 shows measured results which mean average heights among more than 10 measured results. FIG. 3 shows that the height of the grass is on the order of about 7 cm, being a good height, in the case of the diluted liquidus produced by diluting "Flower Factory (registered trademark) including nourishment. Also, the height of the grass was about 7 cm, being a good height, in the case of the plant-cultivating artificial material concerning the present invention containing calcium phosphate, as well as in the case of the diluted liquidus produced by diluting "Flower Factory". The height of the grass was about 11 cm, being the height in the case of the plant-cultivating artificial material concerning the present invention containing calcium phosphate and a nitric acid component.

The height of the grass was lower in other Comparison Tests. This fact suggests that the plant-cultivating artificial material containing calcium phosphate is effective in growing plants. Especially, it is suggested that plant-cultivating artificial material containing both of the nitric acid component and calcium phosphate is effective in growing plants.

Figure 6:
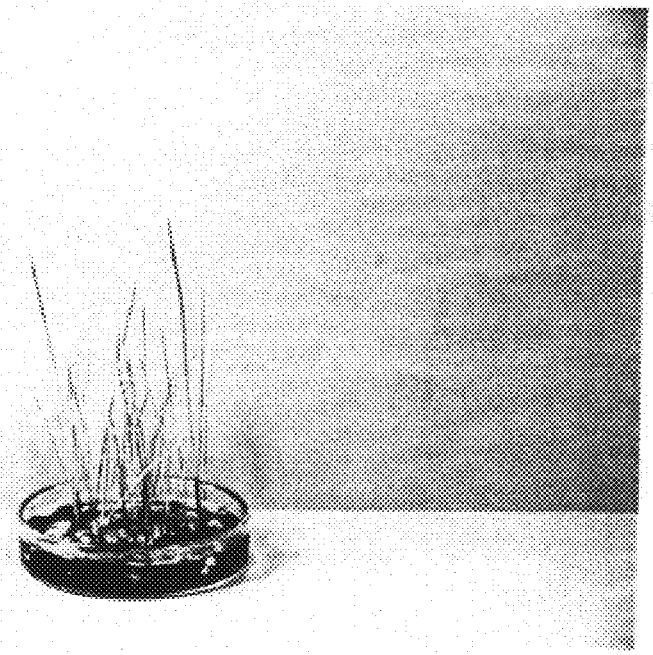
FIG. 6 shows a photograph exhibiting plants, grass, grown by use of soil for organic
Figure 7:
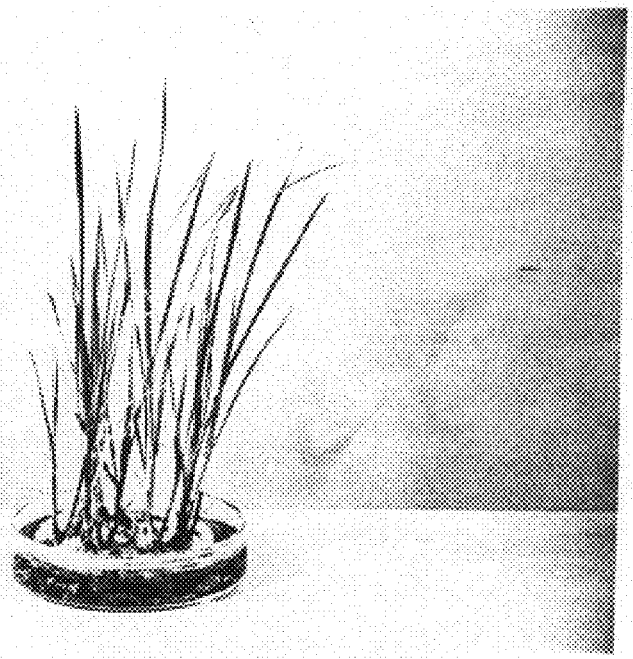
FIG. 7 shows a photograph exhibiting plants, grass, grown by use of a plant-cultivating artificial material concerning the present invention and holding both of the nitric add component and calcium phosphate.

FIGS. 6 and 7 show grown grass after the 29th day from the seeding. FIG. 6 shows the grown grass in using the soil for organic forming. FIG. 7 shows the grown grass in using the plant-cultivating artificial material containing both of nitric acid components and calcium phosphate. The comparison of FIGS. 6 and 7 indicates that the plants early grow in using the plant-cultivating artificial material holding both of calcium phosphate and the nitric acid component Cultivating Test 3

In Cultivating Test 3, present inventors used mixed sand including the plant-cultivating artificial materials of Sample No.1B holding calcium phosphate in such a manner that Sample No.1B occupied 30 volume % when the mixed sand was set to be 100 volume %. Present inventors filled a pot having 200 ml volume with the mixed sand, placed 8 seeds of "Komatsuna" in the pot so as to cultivate them in the aforesaid artificial weather vessel at 25° C. with a light period of 15 hours and a dark period of 9 hours. Present inventors: (1) cut a plant portion being exposed from the ground after 4 weeks; (2) dried the cut plants at 80° C. for 48 hours; and (3) measured the weights of the dried cut plants. The number of the samples was 3. The weight is obtained on the basis of the average from measurements.

Present inventors produced another mixed sand formed by mixing sand with the plant-cultivating artificial materials of Sample No.1B in such a manner that Sample No.1B occupied 10 volume % when the mixed sand was set to be 100 volume %. Present inventors grew "Komatsuna" in the aforesaid artificial weather vessel by using this mixed sand, and measured the dried weight of the cut "Komatsuna".

In addition, as Comparison Test, present inventors grew "Komatsuna" by using only sand and by using still another mixed sand in which sand was mixed with "Isolite" at a rate of 30 volume %, respectively.

Figure 9:
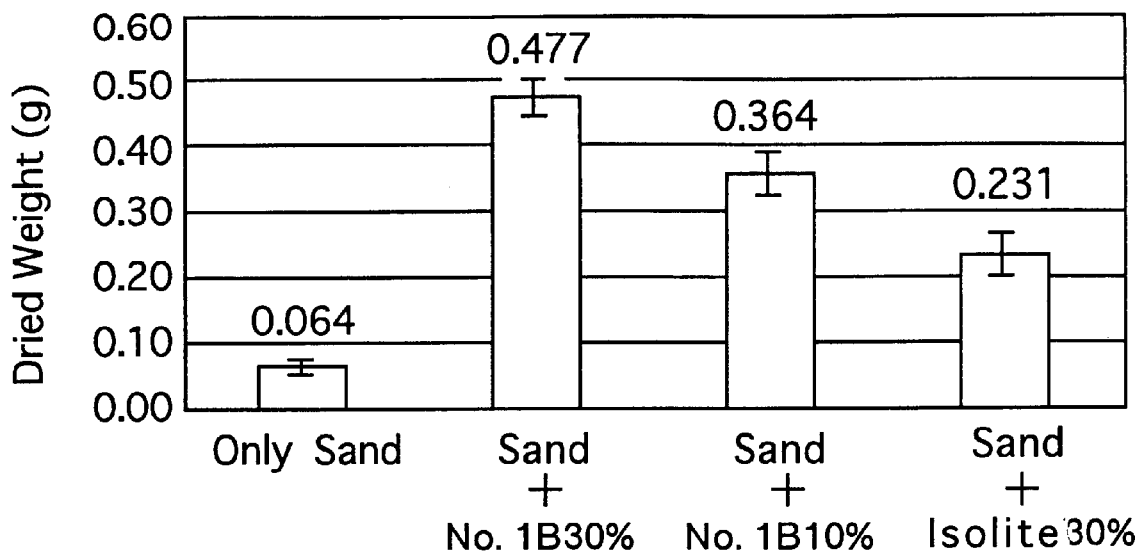
FIG. 9 illustrates a graph of measured results of dried weights of plants, vegetable of "Komatsuna"

FIG. 9 shows the measured results of dried weight. The error bars mean the standard error in FIG. 9. FIG. 9 suggests that the dried weight is large and the growth of plant is promoted when the plant is cultivated by use of the mixed sand in which sand is mixed with the plant-cultivating artificial materials concerning the present invention.

Cultivating Test 4

Cultivating Test 4 was basically similar to Cultivating Test 3 in conditions. Present inventors: (1) selected commercial cultivating soil instead of sand; (2) produced one mixed sand and another mixed sand in which the cultivating soil is mixed with the plant-cultivating artificial materials of Sample No.1B; and (3) grew "Komatsuna" by using the one mixed sand and by using the another mixed sand. The one mixed sand and the another mixed sand include the plant-cultivating artificial materials of Sample No.1B 30 volume %, and 10 volume %, respectively. For Comparison Tests, present inventors also cultivated "Komatsuna" by using only the cultivating soil, and by using a still another mixed sand in which the cultivating soil was mixed with "Isolite" at a rate of 30 volume %.

Figure 10:
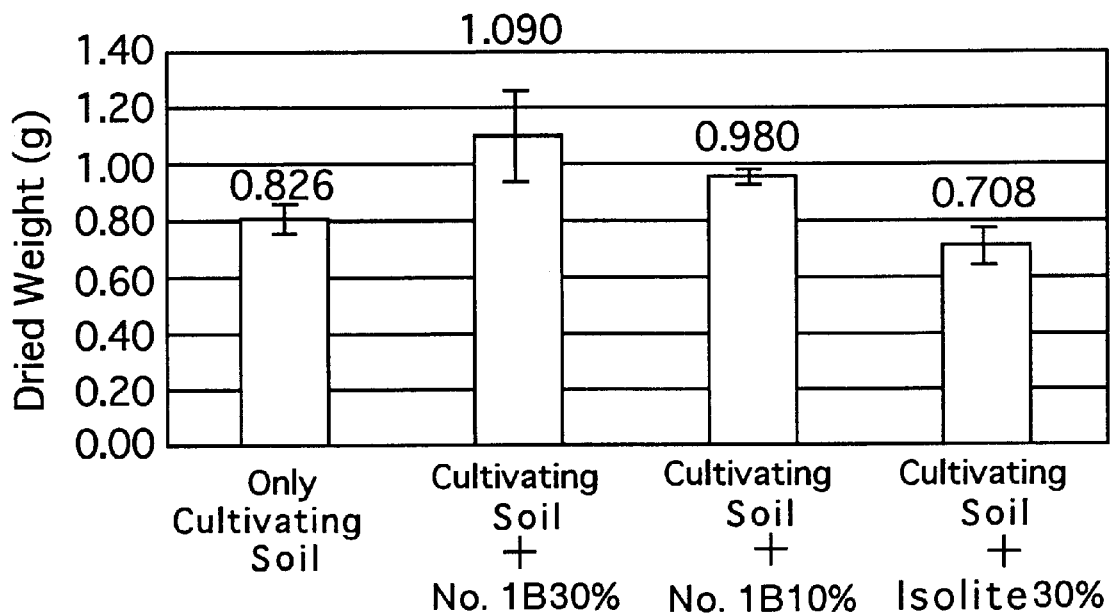
FIG. 10 illustrates a graph of measured results of dried weights of plants, vegetable of "Komatsuna"

FIG. 10 shows the measured results of dried weight in Cultivating Test 4. The error bars mean the standard error in FIG. 10. FIG. 10 suggests that the dried weight is large and the growth of plants is promoted when the plants are cultivated by using the mixed sand in which the cultivating soil is mixed with the plant-cultivating artificial material concerning the present invention.

Cultivating Test 5

Cultivating Test 5 was basically similar to Cultivating Test 3 in conditions. In Cultivating Test 5, however, flowers of "Marigold" (chrysanthemums) were grown instead of "Komatsuna". Present inventors produced one mixed sand in which sand is mixed with the plant-cultivating artificial materials of Sample No.1B. This mixed sand included the plant-cultivating artificial materials of Sample No.1B at a rate of 30 volume %. Present inventors: fulled a pot with this mixed sand; placed 3 seeds of Marigold" to cultivate them in the artificial weather vessel. In growing "Marigold", two leaves after germination was treated so as to grow one leaf Present inventors cut plant-portions exposed from the ground after 9 weeks, dried the cut plant-potions at 80° C. for 48 hours, and measured the dried weight of the cut plant-portions.

Figure 11:
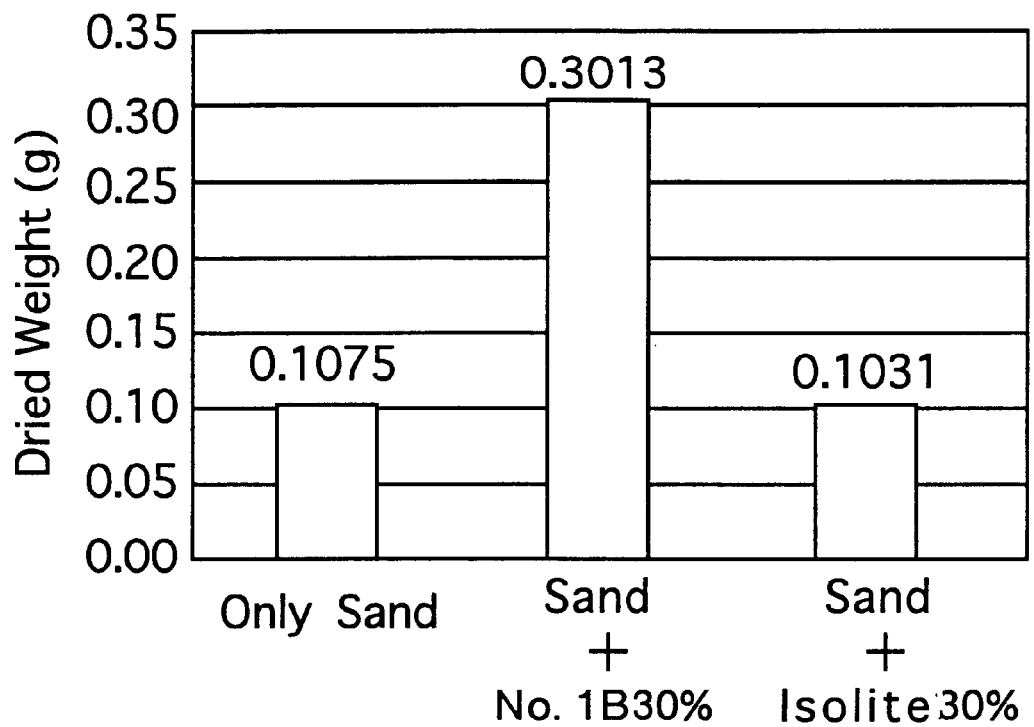
FIG. 11 illustrates a graph of measured results of dried weights of plants, "Marigold"

In addition, as Comparison Test, present inventors grew "Marigold" (chrysanthemums) by using only sand, and by using another mixed sand in which sand was mixed with "Isolite" at a rate of 30 volume %, respectively. FIG. 11 shows the measured results of dried weight in Cultivating Test 5. FIG. 11 indicates that the dried weight is large and the growth of plant is promoted when the plant is cultivated by using the mixed sand in which sand is mixed with the plant-cultivating artificial material concerning the present invention.

Cultivating Test 6

Figure 12:
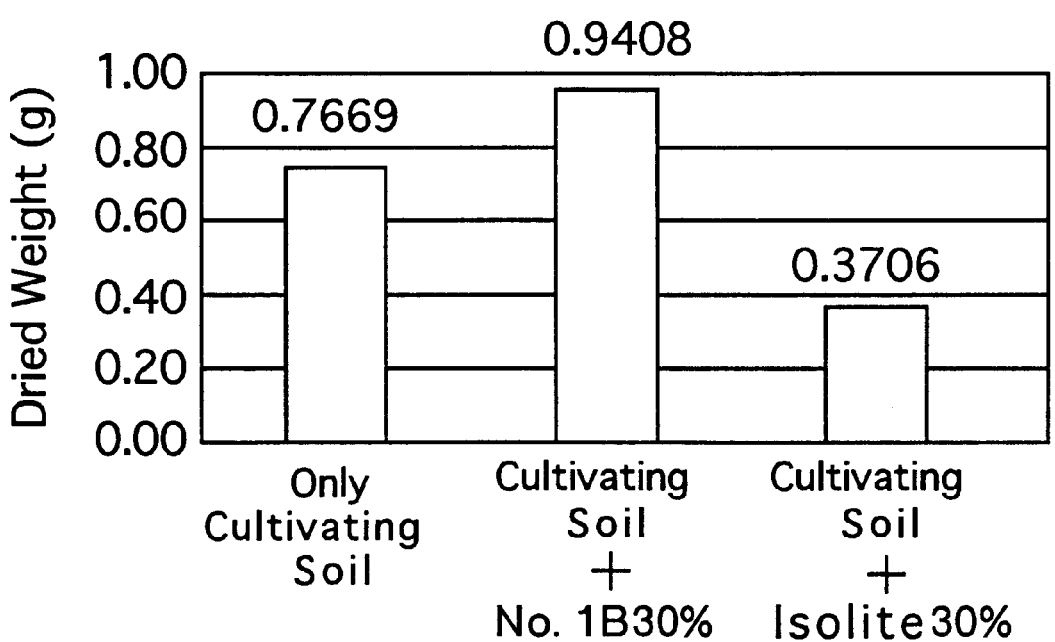
FIG. 12 illustrates a graph of measured results of dried weights of plants, "Marigold"

Cultivating Test 6 was basically similar to Cultivating Test 5 in conditions. Present inventors, however, selected commercial cultivating soil, instead of normal sand, to produce one mixed sand in which cultivating sand is mixed with the plant-cultivating artificial material of Sample No.1B. FIG. 12 shows the measured results. FIG. 12 suggests that the dried weight is large and the growth of plant is promoted in using the mixed sand produced by mixing the plant-cultivating artificial material concerning the present invention.

Cultivating Test 7

Cultivating Test 7 was basically similar to Cultivating Test 3 in conditions. Present inventors, however, used each of Samples A–F varying the total amount of Ca and P. Samples A–F were changed in the amount of the bone material to be mixed with the base material, as shown in Table 6. In Sample D, the bone material was 20% by volume ratio. This ratio means as follows:

base material: bone material=80 vol %:20 vol %

Samples A–F had a particle size of 1.5 mm–3 mm, and they were soaked in a 0.05N nitric add aqueous solution containing nitric acid components. Present inventors produced various mixed sand in which sand was mixed with each of Samples A–F, respectively, in such a manner that each of Samples A–F occupied 10 volume % when the mixed sand was 100 volume %.

Figure 13:
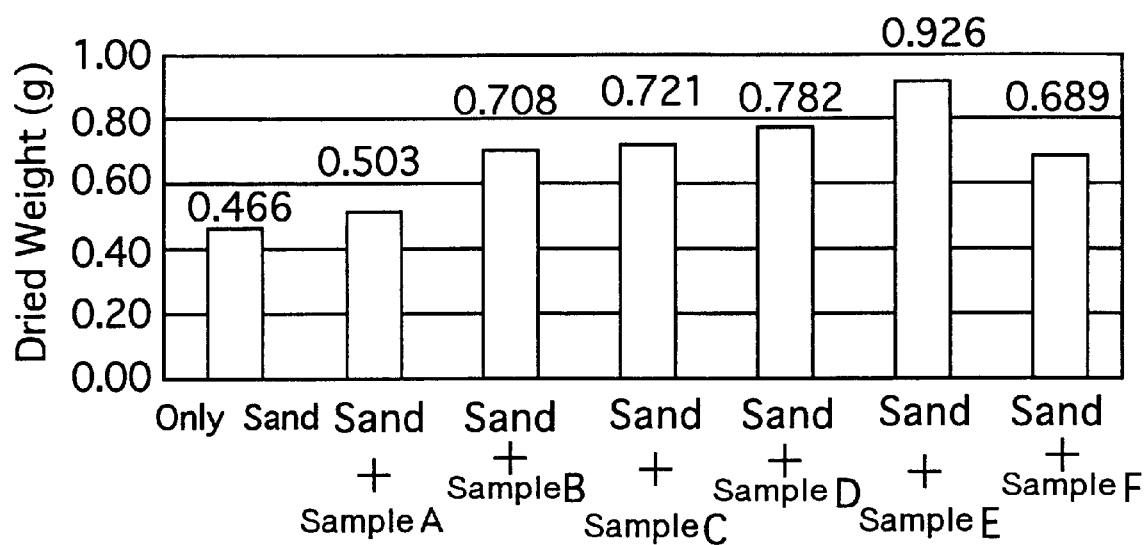
FIG. 13 illustrates a graph of measured results of dried weights of plants, vegetable of "Komatsuna", by use of various mixed sand in which sand is mixed with plant-cultivating artificial materials varying the amount of Ca (calcium) and P (phosphorus).

As well as Cultivating Test 3, present inventors placed 8 seeds of "Komatsuna", and cultivated them in the artificial weather vessel by using each mixed sand. Present inventors: (1) cut plant portions being exposed from the ground after 4 weeks; (2) dried the cut plant-portions at 80° C. for 48 hours; and (3) measured the dried weight of the cut plant-portions. FIG. 13 shows the measured results of dried weight. FIG. 13 indicates that the growth of the plant is also promoted in using the mixed sand mixing each of Samples A–F. In Sample A, the total amount of Ca and P was 0.65% . In Sample F, the total amount of Ca and P was 32.5%. In Sample B, the total amount of Ca and P was 3.25%. In Sample F, the total amount of Ca and P was 32.5%. FIG. 13 indicates that Samples B–F exhibit a good result, respectively. These results indicate that the plant effectively grows when the amount of Ca and P is above 3%.

Still, similar results are to be obtained in the case of another plant-cultivating artificial material being produced by mixing the base material with an additive industrially made of calcium phosphate, as well as in the case of the plant-cultivating artificial material being produced by mixing the base material with the bone material.

TABLE 1

| Sample No. | Size mm | Bone Material vol % | N.A.T. | SiO$_2$ | Al$_2$O$_3$ | MgO | FeO | MnO | Na$_2$O | K$_2$O | S | Zn | Ca + P in calcium phosphate | NO$_3^-$ |
|---|---|---|---|---|---|---|---|---|---|---|---|---|---|---|
| No. 1 | 1.5-3 | 30 | X | 58.30 | 14.40 | 2.39 | 4.22 | 0.07 | 1.84 | 0.56 | 0.20 | 0.02 | 12.03 | 0.051 |
| No. 2 | 5~7 | 30 | X | 55.50 | 13.80 | 2.48 | 4.20 | 0.08 | 1.90 | 0.59 | 0.27 | 0.02 | 8.17 | 0.126 |
| No. 3 | 7~12 | 30 | X | 55.50 | 13.80 | 2.48 | 4.20 | 0.08 | 1.90 | 0.59 | 0.27 | 0.02 | 15.00 | 0.111 |
| No. 1B | 1.5~3 | 30 | ○ | 59.60 | 14.70 | 2.24 | 4.42 | 0.07 | 1.89 | 0.55 | 0.14 | 0.02 | 10.38 | 0.728 |
| No. 2B | 5~7 | 30 | ○ | 60.80 | 15.30 | 2.21 | 5.90 | 0.11 | 1.91 | 0.58 | 0.17 | 0.02 | 6.94 | 0.711 |
| No. 3B | 7~12 | 30 | ○ | 61.00 | 15.50 | 2.28 | 5.12 | 0.10 | 1.91 | 0.58 | 0.17 | 0.02 | 7.33 | 0.667 |

Sample (N.A.T. = Nitric Acid Treatment)

TABLE 2

| Sample No. | Size mm | Bone Material vol % | N.A.T. | SiO$_2$ | Al$_2$O$_3$ | MgO | FeO | MnO | Na$_2$O | K$_2$O | S | Zn | Ca + P in calcium phosphate | NO$_3^-$ |
|---|---|---|---|---|---|---|---|---|---|---|---|---|---|---|
| No. 11 | 7~12 | 50 | X | 40.50 | 8.56 | 2.04 | 2.50 | 0.04 | 1.54 | 0.50 | 0.21 | 0.01 | 37.79 | 0.185 |
| No. 12 | 7~12 | 30 | X | 55.50 | 13.80 | 2.48 | 4.20 | 0.08 | 1.90 | 0.59 | 0.27 | 0.02 | 15.00 | 0.111 |
| No. 13 | 7~12 | 10 | X | 59.10 | 15.50 | 2.51 | 4.99 | 0.09 | 1.99 | 0.59 | 0.26 | 0.02 | 8.97 | 0.181 |
| No. 11B | 7~12 | 50 | ○ | 41.60 | 9.04 | 1.89 | 2.62 | 0.04 | 1.58 | 0.52 | 0.22 | 0.02 | 36.24 | 0.806 |
| No. 12B | 7~12 | 30 | ○ | 56.70 | 14.00 | 2.29 | 4.35 | 0.08 | 1.92 | 0.59 | 0.23 | 0.02 | 13.79 | 0.682 |
| No. 13B | 7~12 | 10 | ○ | 60.30 | 15.90 | 2.46 | 5.17 | 0.09 | 2.02 | 0.59 | 0.22 | 0.02 | 7.13 | 0.706 |

TABLE 3

| | Normality of Nitric Acid Aqueous Solution | NO$_3^-$ weight % |
|---|---|---|
| No. 50 | 5 N | 18.356 |
| No. 51 | 1 N | 3.653 |
| No. 52 | 0.1 N | 0.656 |
| No. 53 | 0.01 N | 0.251 |

TABLE 4

| Concentration of Nitric Acid Aqueous Solution | Amount of Nitric Acid Ion weight % Uncrushed Case | Amount of Nitric Acid Ion weight % Crushed Powder Case | Diluting Rate |
|---|---|---|---|
| 13 N | 27.1% | 29.4% | × 10$^4$ |
| 5 N | 18.9% | 21.2% | × 10$^4$ |
| 1 N | 3.65% | 3.97 | × 10$^3$ |
| 0.1 N | 0.656 | 0.68% | × 10$^3$ |
| 0.01 N | 0.251 | 0.27% | × 10$^2$ |

TABLE 5

| Concentration of Nitric Acid Aqueous Solution | Analysis Value of Nitric Acid Component in Diluted Liquid | | |
|---|---|---|---|
| | After First Extraction | After Second Extraction | After Third Extraction |
| 1 N | 2770 ppm | 254.9 ppm | 5.7 ppm |
| 0.1 N | 336.5 ppm | 37.0 ppm | 3.7 ppm |
| 0.01 N | 75.5 ppm | 19.8 ppm | 3.1 ppm |

TABLE 6

| | Concentration of Nitric Acid Aqueous Solution | Amount of Bone Material Volume % | Amount of Ca + P Weight % | Particle Diameter mm |
|---|---|---|---|---|
| Sample A | 0.05 N | 1% | 0.65% | 1.5 mm |
| Sample B | | 5% | 3.25% | |
| Sample C | | 10% | 6.5% | — |
| Sample D | | 20% | 13% | 3 mm |
| Sample E | | 30% | 19.5% | |
| Sample F | | 50% | 32.5% | |

Additional Remarks

Next technical thoughts will hereinafter is grasped from the description of the above mention.

Remark(1) A process for producing a plant-cultivating artificial material comprising the steps of:

preparing a base material containing at least one of silica and alumina as a major component with a powder or granular shape, and preparing bone material containing calcium phosphate and gathered from an organism;

mixing the base material with the bone material to obtain a mature, and forming a green body having a predetermined shape by the mixture; and heating the green body in a heated atmosphere to obtain a porous sintered body to hold a bone material component supplied from the bone material in the porous sintered body, and thereby obtaining a plant-cultivating artificial material.

Remark(2) A process for producing a plant-cultivating artificial material comprising the steps of:

preparing a base material containing at least one of silica and alumina as a major component with a powder or granular shape, and preparing bone material containing calcium phosphate and gathered from an organism;

mixing the base material with the bone material to obtain a mixture, and forming a green body by the mixture;

heating the green body in a heated atmosphere to obtain a porous sintered body to hold a bone material component; and bringing the sintered body into contact with a liquid including a nitric acid component, and thereby holding the nitric acid component in the sintered body.

Remark(3) The plant-cultivating artificial material or the process according to at least one of Remarks 1 and 2, wherein the sintered body has pores, and the pore falls in a range from 0.01 μm to 3 mm in average diameter, in a range from 0.1 μm to 1 mm in average diameter, or in a range from 1 μm to 500 μm.

Remark(4) The plant-cultivating artificial material according to at least one of Remarks 1 to 3: wherein the plant-cultivating artificial material contains Ca (calcium) and P (phosphorus); and when the total amount of the plant-cultivating artificial material is set to be 100%, the amount of Ca (calcium) and P (phosphorus) constituting bone material or calcium phosphate is set in a range from 3% to 50% by weight ratio.

What is claimed is:

1. A plant-cultivating artificial material comprising:
a porous sintered body containing at least one of silica or alumina as a major component, wherein said porous sintered body has a porosity of from 5 to 80% based on volume; and
a substance mainly composed of a bone material component or calcium phosphate, said substance held in said porous sintered body.

2. The plant-cultivating artificial material according to claim 1, further comprising a nitric acid component being held in said porous sintered body.

3. The plant-cultivating artificial material according to claim 2, wherein said nitric acid component is $NO_3^-$ ion, and the amount of $NO_3^-$ is set in a range from 0.2% to 30% by weight ratio when the total amount of said plant-cultivating artificial material is set to be 100%.

4. The plant-cultivating artificial material according to claim 1, wherein said plant-cultivating artificial material contains Ca (calcium) and P (phosphorus), and
when the total amount of said plant-cultivating artificial material is set to be 100%, the amount of Ca (calcium) and P (phosphorus) is set in a range from 3% to 50% by weight ratio.

5. The plant-cultivating artificial material according to claim 1, wherein said sintered body has pores, and said pores fall in a range from 0.01 μm to 3 mm in average diameter.

6. The plant-cultivating artificial material according to claim 1, wherein said sintered body has pores, and said pores fall in a range from 0.1 μm to 1 mm in average diameter.

7. The plant-cultivating artificial material according to claim 1 that comprises a porous sintered body that has an average diameter ranging from 50 μm to 50 mm.

8. The plant-cultivating artificial material according to claim 1, wherein at least one part of the pores is formed by dissolving, melting or burning said bone material or said calcium phosphate.

9. The plant-cultivating artificial material according to claim 1 that comprises a porous sintered body that has an average diameter ranging from 500 μm to 20 mm.

10. The plant-cultivating artificial material according to claim 1, wherein said bone material or said calcium phosphate is contained in both of the surface and the inside of said porous sintered body.

11. The plant-cultivating artificial material according to claim 1 that comprises a porous sintered body containing at least one component selected from the group consisting of magnesium oxide, iron oxide, sodium oxide, and potassium oxide.

12. A process for producing a plant-cultivating artificial material comprising:
preparing a base material containing at least one of silica or alumina as a major component and having a powder or granular shape;
preparing a mixing substance mainly composed of at least one of bone material and an additive, wherein said bone material contains calcium phosphate and is gathered from an organism and wherein said additive is mainly composed of calcium phosphate;
mixing said base material with said mixing substance to obtain a mixture and forming a green body of said mixture; and
heating said green body in a heated atmosphere to obtain a porous sintered body,
wherein said porous sintered body has a porosity of from 5 to 80% based on volume and wherein the porous sintered body holds a bone material component supplied from said bone material or said porous sintered body holds calcium phosphate supplied from said additive in said porous sintered body, thereby obtaining a plant-cultivating artificial material.

13. The process according to claim 12, comprising the additional step of bringing said porous sintered body into contact with a liquid including a nitric acid component after said heating step, and thereby holding said nitric acid component in said sintered body.

14. The process according to claim 13, wherein said nitric acid component is $NO_3^-$, and
the amount of $NO_3^-$ in said plant-cultivating artificial material is set in a range from 0.2% to 30% by weight ratio when the total amount of said plant-cultivating artificial material is set to be 100%.

15. The process according to claim 13, wherein a concentration of said liquid including said nitric acid component is set in a range from 0.01N to 20N in normality.

16. The process according to claim 12, wherein said plant-cultivating artificial material contains Ca (calcium) and P (phosphorus); and
when the total amount of said plant-cultivating artificial material is set to be 100%, the amount of Ca (calcium) and P (phosphorus) is set in a range from 3% to 50% by weight ratio in said plant-cultivating artificial material.

17. The process according to claim 12, wherein said porous sintered body has pores, and said pores fall in a range from 0.1 μm to 1 mm in average diameter.

18. The process according to claim 12, wherein said base material prepared in said preparing step is formed of at least one selected from the group consisting of sand, dust-wastes, and sludge-wastes.

19. The process according to claim 12, wherein said base material prepared in said preparing step is set in a range from 1 μm to 200 μm in average diameter.

20. The process according to claim 12, wherein said base material in said preparing step is set in a range from 3 μm to 50 μm in average diameter.

21. The process according to claim 12, wherein said bone material is selected from at least one selected from the group consisting of beasts and fishes.

22. The process according to claim 12, wherein said additive is an artificial product composed of calcium phosphate as a major component.

23. The process according to claim 12, wherein said bone material prepared in said preparing step is crushed to form at least one selected from the group consisting of a powder shape, a granular shape, and a shard shape.

24. The process according to claim 12, wherein said green body in said mixing and forming step has at least one selected from the group consisting of a granular shape, a pellet shape, and a block shape.

25. The process according to claim 12, wherein a mixing rate between said base material and said bone material by volume ratio in said mixing and forming step is set as follows:

(base material:bone material)=β,

β is set in a range from (20:80) to (95:5).

26. The process according to claim 12, wherein temperature of said heating step is set in a range from 400 to 1400° C.

27. The process according to claim 12, wherein temperature of said heating step is set in a range from 700 to 1400° C.

28. The process according to claim 12, wherein heating time of said heating step is set in a range from 10 minutes to 10 hours.

29. The process according to claim 12, wherein said porous sintered body after said heating step is set in a range from 40% to 80% in porosity rate based on volume.

30. The process according to claim 12, wherein said bone material or said calcium phosphate is contained in both of the surface and inside of said porous sintered body after said heating step.

31. The process according to claim 12, wherein in said mixing step, said mixture having base material with said mixing substance is inserted in a container having a stirring blade, and said mixture is formed to a green body by frictional forces between said mixture and a wall of said container by rotating said stirring blade.

* * * * *